(12) United States Patent
Ramanathan (10) Patent No.: US 6,959,451 B1
(45) Date of Patent: Oct. 25, 2005

(54) TRANSMISSION COMMUNICATIONS MANAGEMENT

(75) Inventor: Ramanathan Ramanathan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/138,054

(22) Filed: Aug. 21, 1998

(51) Int. Cl.⁷ ............................................. H04N 7/16
(52) U.S. Cl. ...................... 725/148; 725/116; 725/118; 725/146; 725/148; 370/229; 370/230
(58) Field of Search .......................... 725/91, 144, 147, 725/148, 67, 70, 116, 118, 146; 709/233, 709/234, 328, 230; 370/229, 230, 465, 468

(56) References Cited

U.S. PATENT DOCUMENTS

| | | | | |
|---|---|---|---|---|
| 3,691,295 A | * | 9/1972 | Fisk | 370/284 |
| 5,087,518 A | * | 2/1992 | Shimada et al. | 428/325 |
| 5,229,850 A | * | 7/1993 | Toyoshima | 348/153 |
| 5,497,460 A | * | 3/1996 | Bailey et al. | 714/39 |
| 5,506,844 A | * | 4/1996 | Rao | 370/84 |
| 5,790,170 A | * | 8/1998 | Suzuki | 725/1 |
| 5,987,519 A | * | 11/1999 | Peifer et al. | 709/205 |
| 6,038,625 A | * | 3/2000 | Ogino et al. | 709/328 |
| 6,044,396 A | * | 3/2000 | Adams | 348/386.1 |
| 6,078,919 A | * | 6/2000 | Ginzburg et al. | 707/10 |
| 6,181,711 B1 | * | 1/2001 | Zhang et al. | 370/468 |
| 6,185,736 B1 | * | 2/2001 | Ueno | 725/95 |
| 6,225,993 B1 | * | 5/2001 | Lindblad et al. | 345/716 |
| 6,240,460 B1 | * | 5/2001 | Mitsutake et al. | 709/235 |
| 6,314,111 B1 | * | 11/2001 | Nandikonda et al. | 370/473 |
| 6,618,392 B1 | * | 9/2003 | Bray | 370/465 |

OTHER PUBLICATIONS

Intel Corp., "Intel Intercast® Technology," pp. 1-29, printed from web site http://developer.intel.com/drg/hybrid-author/cookbooks/intercast, dated at least as early as Jun. 2, 1998.
Intel Corp., "How Intel Intercast® Technology Works," pp. 1-2, printed from web site http://www.intercast.com/intercast/howitwks.htm, dated at least as early as Jul. 15, 1998.

\* cited by examiner

Primary Examiner—Ngoc Vu
(74) Attorney, Agent, or Firm—Trop, Pruner & Hu, P.C.

(57) ABSTRACT

An interactive transmission system having a data management module that identifies at least one transmission characteristic of at least one transmitter module. The transmitter module transmits data over a transport medium. The data management module modifies its behavior based on the identified at least one transmission characteristic.

29 Claims, 4 Drawing Sheets

TRANSMISSION COMMUNICATIONS MANAGEMENT

BACKGROUND

The invention relates to transmission communications management.

In an interactive broadcasting system, digital information may be encoded into broadcast television signals and transmitted to a home personal computer that has been configured to receive the information. A technology developed for transporting such a combination of digital information and broadcast TV signals is the Intel® Intercast® technology.

The Intercast® technology includes three parts: the broadcast headend, the transport, and the platform. At the broadcast headend, such as a television studio, broadcasters may create digital data such as Web pages, multimedia applications or other data files. The digital data is then assembled into packages and scheduled for insertion into the broadcast signal so that the broadcast signal can carry the TV audio, TV video, and digital data.

The combined digital and TV broadcast signal may be transmitted over a number of different transports, including regular television airwave broadcasts, satellite transmissions, cable transmissions, digital TV transmissions, or computer networks such as local area networks (LANs) or wide area networks (WANs).

At the receiving end, or the platform, which may be a TV-enabled personal computer or a set-top box, the broadcast signal (with inserted digital data) is received and processed for display. A TV tuner appropriate to the transport is used for receiving the broadcast signal. Data processing is then preformed by video capture and decode circuitry, which may be integrated with the tuner that receives the regular TV signals.

The different transports that are able to transmit such broadcast signals have different transmission rates and different protocols. Thus, a need arises for broadcast equipment that is capable of supporting multiple broadcast transports.

SUMMARY

The invention is generally directed to a transmission system in which a data management module manages data flow based on a characteristic of a transmitter that is coupled to a transport medium.

Other features will become apparent from the following description and from the claims.

DETAILED DESCRIPTION

Figure 1:
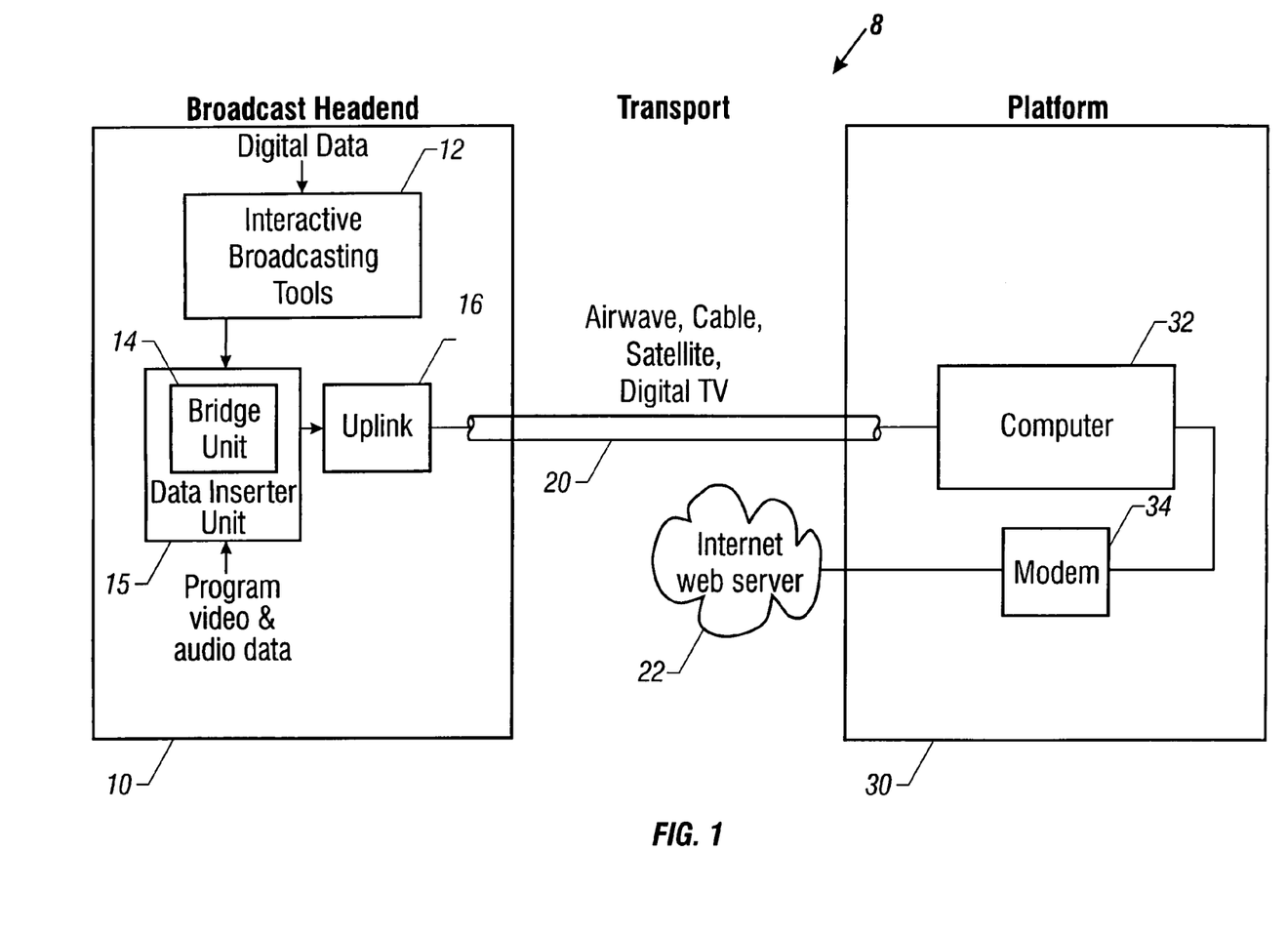
FIG. 1 is a block diagram of a broadcast system incorporating an embodiment of the invention.

Referring to FIG. 1, an example transmission system 8 (which may be an interactive broadcast system, for example) is illustrated that includes a broadcast headend system 10, one or more transports 20, and one or more platforms 30 to receive the broadcast signals. At the broadcast headend system 10, which includes a computer system along with other broadcast-related components (which may be located at a TV studio, for example), digital data are provided to a system containing interactive broadcasting application programs 12, which assemble the received digital data into packages and schedule them for insertion into a broadcast signal. The assembled data from the interactive broadcasting application programs 12 are routed to a data inserter unit 15 including a bridge unit 14, which also receives broadcast program video and audio data (TV data). The bridge unit 14 multiplexes the digital data and the TV data and provides the combined data to an uplink block 16. In some embodiments, the system containing the interactive broadcasting application programs 12 and the data inserter unit 15 may be separate systems, while in other embodiments the units may be implemented as one integrated system.

The uplink block 16 in turn transmits (by broadcasting or multicasting, for example) the combined digital and TV data over one or more transport media or communications channels 20, which may be the broadcast airwaves, a cable medium, a satellite medium, a computer network (such as local area networks, wide area networks, or the Internet), or a digital TV medium, to one or more platforms 30. An example platform 30 may include a TV-enabled computer 32 that is configured to receive the combined digital and PC broadcast data over the transport medium 20. The computer 32 may also include a modem 34 that may be connected to an Internet Web server 22.

According to embodiments of the invention, the bridge unit 14 is able to automatically adjust for the different characteristics of different transport media 20, including data flow rates and other characteristics as described below. Further, each particular transport medium may have transport characteristics that vary over time, for which the bridge unit 14 may also make adjustments. The bridge unit 14 may be implemented entirely in software that runs in the computer system in the broadcast headend system 10, or alternatively, the bridge unit 14 may be a combination of hardware and software.

Figure 2:
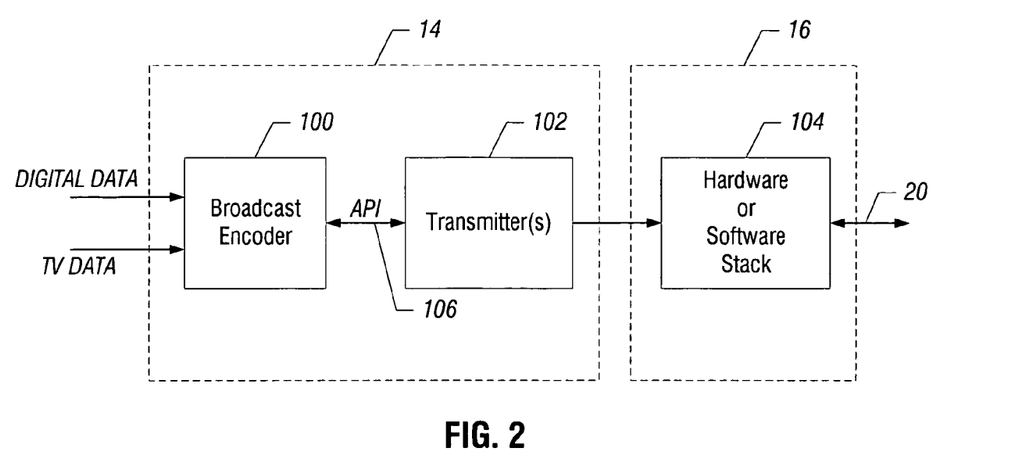
FIG. 2 is a block diagram of a transmitter and a broadcast encoder according to an embodiment of the invention.

In some embodiments, the bridge unit 14 and uplink block 16 include several components as shown in FIG. 2. The bridge unit 14 includes a broadcast encoder 100 (implemented in one embodiment as a software module) that interleaves digital data received from the application programs 12 with television programming data. The broadcast encoder 100 is able to work with a number of different types of transport media 20. To provide for such flexibility, one or more different transmitters 102 that are configured for corresponding transport media are also included in the bridge unit 14. In one embodiment, each transmitter 102 is essentially a transport abstraction implemented as a software module that acts as the interface between application programs (including the broadcast encoder 100), and the connected transport media 20.

In one embodiment, the broadcast encoder 100 and one or more of the transmitters 102 exchange information on a "continuous" (or continued) basis so that the broadcast encoder 100 may efficiently and reliably manage communications for different transport media and as transmitter characteristics change. The exchange of information may be performed by the broadcast encoder 100 periodically polling each transmitter 102 or by a transmitter 102 requesting an update, for example. The exchange of information is continuous in the sense that the broadcast encoder 100 and transmitters 102 continue to exchange information after startup of the broadcast encoder 100 or one of the transmitters 102. In an alternative embodiment, multiple broadcast encoders may be specified for use with multiple corresponding transmitters.

Advantages of embodiments of the invention may include the ability to automatically control data flow that is transparent to application programs in the broadcast headend system 10. In addition, embodiments of the invention may allow for transport independence at the broadcast headend in interactive broadcast systems.

The broadcast encoder 100 mixes the digital data and the TV programming data according to the type of transport medium 20 used. For example, if the transport medium uses an analog broadcast signal (transmitted over analog airwave or cable media, for example), the digital data is inserted into the vertical blanking interval (VBI) portion of the broadcast signal. The VBI portion of the broadcast signal may also be used to transmit, among other things, closed captioning data. Conventionally, in an analog broadcast signal, a predetermined number (e.g., 10) of VBI lines are available, with each line having a predetermined data transmission capacity. A portion of the available VBI lines is typically used to carry the digital data.

Other transport media, such as satellite transmissions or digital TV transmissions, may have much higher data transmission rates.

Data from the bridge unit 14 is transmitted to the uplink unit 16, which typically may include a hardware unit (or sometimes a software stack) that ships the data along with other contents over a specified transport medium 20, which may be any network that supports broadcast or multicast transmissions.

Characteristics of a transport medium 20 are communicated by a corresponding transmitter 102 to the broadcast encoder 100 through negotiations between the broadcast encoder and the transmitters. Each transmitter 102 may be configured as a separate module, such a Component Object Model (COM) object. The COM specification is described in "The Component Object Model Specification," Draft Version 0.9, Microsoft Corporation and Digital Equipment Corporation (October 1995).

The behavior of the broadcast encoder 100 is modified based on the capabilities that the one or more transmitters 102 advertise. The broadcast encoder 100 and each transmitter 102 are loosely coupled, with the communications between a transmitter and the broadcast encoder in one embodiment being accomplished through an application specific interface (API). During negotiations between the broadcast encoder 100 and each transmitter 102 through the API interface, the broadcast encoder 100 obtains details of the characteristics of each transmitter 102 to allow the broadcast encoder 100 to efficiently manage data communications over the transport media 20. In the API interface, several methods are defined through which the broadcast encoder and transmitters exchange information.

To increase efficiency of data transfer between the broadcast encoder and the transmitter, each transmitter 102 according to an embodiment is configured as a COM object to the broadcast encoder that has two interfaces: ITransmitter, which is the transmitter's primary interface for data communication and control; and the IPropertyPage interface for configuration management. Any application (including the broadcast encoder 100) that uses the transmitters 102 in the described embodiment first obtains the ITransmitter interface to set up communications with each transmitter 102.

In alternative embodiments, negotiations between the broadcast encoder and each transmitter may be accomplished with other interfaces, including use of OLE events defined under the Object Linking and Embedding (OLE) standard, described in David Chappell, "Understanding ActiveX and OLE: A Guide for Developers & Managers," published in 1996.

In the described embodiment, the transmitter 102 may accept two general types of data: raw data streams or predefined datagrams. Raw data streams are transmitted by the broadcast encoder 100 or another application by calling a Send( ) method, and datagrams are transmitted using a SendDatagrams( ) method. When data is provided by the broadcast encoder 100 or some other application to the transmitter 102 using the Send( ) method, the transmitter 102 does not know the type of data that is passed to it. When a transmitter 102 receives this kind of data, it does not interpret this data but instead passes the data on to another device or software module.

The Send( ) method in one embodiment writes the data pointed to in the method to a target transmitter 102. When a Send( ) call returns, the broadcast encoder 100 along with the other applications may assume that the data bits have actually been written to the transmitter. The Send( ) method is a blocking call, and will return a value if one of the following conditions occur: the transmission was successful, a timeout occurred, an error occurred, or the caller has aborted the call.

Figure 3:
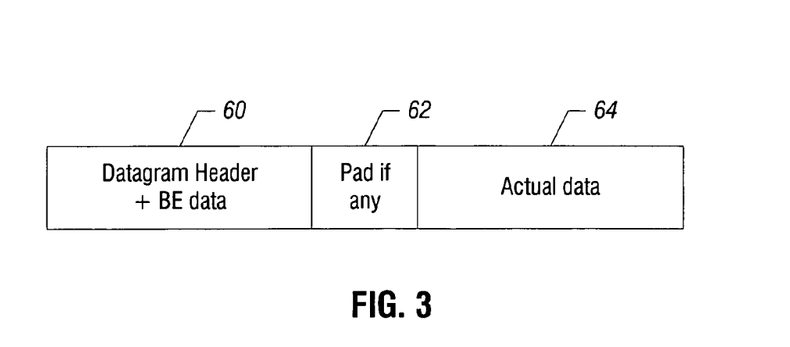
FIG. 3 illustrates an example data structure used for communication between the transmitter and broadcast encoder of FIG. 2.

The other type of data, predefined datagrams such as Internet Protocol (IP) or User Datagram Protocol (UDP) datagrams that are transmitted by calling the SendDatagrams( ) method, have known formats. The SendDatagrams( ) method is similar to the Send( ) method. The IP protocol is described in "Internet Protocol, DARPA Internet Program, Protocol Specification," Request for Comment 791 (September 1981), and the UDP protocol is described in "User Datagrams Protocol," Request for Comment 768 (August 1980). Each datagram may include header information that may have the following types of information: version information; length of the header; type of datagram, including UDP, IP, and raw data; length of the data; flags; compression used; and other information. A datagram header may also be followed by broadcast encoder data that describe certain details of the broadcast encoder 100. The datagram also includes the actual data that is being transmitted. An example IP datagram is shown in FIG. 3, in which a block 60 contains the header information and broadcast encoder information, a block 64 contains the actual data, and a block 62 may optionally be used as a pad region. A transmitter 102 is able to reformat a datagram received from the broadcast encoder 100 or other application program for transmission further downstream.

The behavior of the broadcast encoder 100 is dependent on information advertised by each transmitter 102 from negotiations the broadcast encoder 100 performs with one or more transmitters 102. Depending on how many transport media 20 is used in the system, more than one transmitter 102 may be active at the same time. According to an embodiment of the invention, several methods may be used to perform these negotiations, including GetConfiguration( ), GetAdjustmentRate( ), GetNumSendErrors( ), and GetFreeBuff( ), which are discussed further below.

Figure 4:
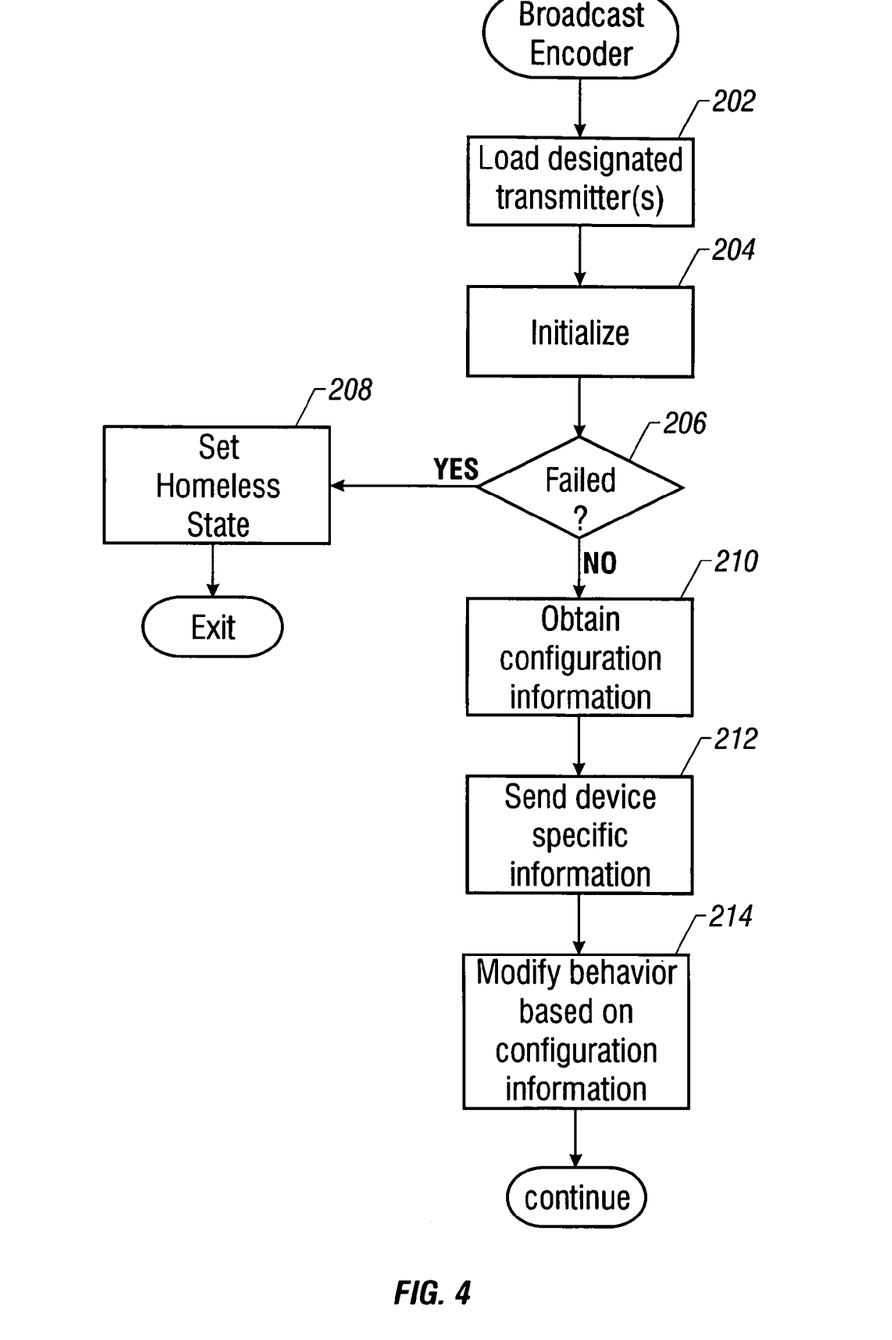
FIG. 4 is a flow diagram of a process performed by the broadcast encoder according to an embodiment of the invention.

Referring to FIG. 4, the tasks performed by the broadcast encoder 100 of one embodiment during the negotiation process with the transmitter 102 are described. First, through the IPropertyPage API interface, the broadcast encoder 100 loads (at 202) the one or more designated transmitters 102 into the broadcast headend system 10. Transmitters may be designated in a preselected database, such as the registry under the Windows operating system. In addition, the loaded transmitters 102 are initialized (at 204) by calling a method Initialize( ). Once an Initialize( ) method is issued, each transmitter 102 responds by allocating memory (such as internal buffers) and initializing any variables and device settings. The Initialize( ) method may be a blocking call, with the call returning only if the system is really initialized. The broadcast encoder 100 checks (at 206) to determine if the loading and initialization is successful. If a failure is detected, then the broadcast encoder 100 designates itself as being in a Homeless state (at 208), in which the broadcast encoder 100 does not accept or send any data.

But if the loading and initialization were successful (as determined at 206), then the broadcast encoder 100 requests (at 210) the configuration information from the one or more transmitters 102 using the GetConfiguration( ) method. When a transmitter receives the GetConfiguration( ) call, the transmitter advertises its capabilities. Some of the outputs are already known to the broadcast encoder 100 and some are specific to the class of transmitter involved. For example, a transmitter associated with a VBI transport will have a field indicating the number of VBI lines used. The types of information that a transmitter can send include the following: the version, length of the header, name of the transmitter, some description of the transmitter, the transfer rate, the maximum transmission unit, the buffer size, if any, the timeout and seconds per datagram (if any), the data gram type (UDP, IP, or raw data), flags, padding size, and other information. The configuration information received from each transmitter 102 is stored in memory by the broadcast encoder 100 at predefined memory locations. The stored transmitter configuration information is used at a later time to modify the broadcast encoder's behavior.

Next, the broadcast encoder 100 may send (at 212) device specific information (information describing certain details of the broadcast encoder 100) to each of the transmitter 102. In the illustrated embodiment, the method used to communicate this information is a RegisterStream( ) method. The broadcast encoder 100 stores all the stream-related information in a data structure (referred to as OPENSTREAM) and allocates a handle (address information indicating where the OPENSTREAM structure is stored) that is passed to the transmitter 102 in the RegisterStream( ) method. This handle may be passed by the broadcast encoder 102 in subsequent datagrams (in block 60 of the example datagram of FIG. 3).

Next, the broadcast encoder uses (at 214) the configuration information advertised by each transmitter 102 in response to the GetConfiguration( ) method to modify its behavior. In the illustrated embodiment, the configuration information is stored in a data structure, referred to as the CONFIG data structure. Transmitters associated with different transport media have different characteristics. Some characteristics may include the maximum transfer rate that a transport medium can handle, the maximum size of each data packet (also refer to as the maximum transmission unit or MTU), whether compression is used, whether internal buffers are used in the transmitter, the type of data management (if any) performed by each transmitter, whether framing of data is performed, and whether fragmentation of the data is performed.

Another characteristic of a transmitter is whether it understands the concept of priorities. Thus, if the transmitter is able to assign priorities to data it receives, then the broadcast encoder 100 does not perform priority assignment, leaving the task to the transmitter 102. If the transmitter 102 is unable to prioritize the received data stream, then the broadcast encoder 100 multiplexes the data stream based on the requested priority from the application programs 12.

Yet a further transmitter characteristic is bandwidth management, in which the transmitter 102 may advertise that it is able to perform bandwidth management. Similarly, the broadcast encoder 100 may also optionally allow the transmitter 102 to perform data compression if the transmitter 102 is able to do so. Other characteristics that may be negotiated between the broadcast encoder and the transmitters include the basic data types that a transmitter requires. In one embodiment, the data types include raw data streams, Internet Protocol (IP) data, user datagram protocol (UDP) data, or other types of data. Raw data streams may be used in network interfaces not requiring an IP or UDP header. In addition, a transmitter 102 may ask the broadcast encoder 100 to repackage data before it is transmitted to the transmitter.

Some of the characteristics of the transmitters are further discussed below. The maximum transmission unit (MTU) refers to the maximum size of a single IP or UDP datagram. If an MTU is advertised, the broadcaster encoder 100 sets the size of each datagram to be less than or equal to the advertised MTU. If a software layer (such as the broadcaster encoder 100) sends data that is more than the specified MTU size, then the IP layer (such as the transmitter 102) may fragment the data into MTU-sized datagrams before further transmission. In some embodiments, a transmitter 102 does not need to advertise the MTU of its transport medium. Instead a transmitter 102 may advertise its MTU as having the value zero, in which case the transmitter 102 would perform its own internal buffering, fragmentation, and data management.

In addition to using the configuration information advertised by the transmitters, other methods used by the broadcast encoder 100 to determine transmitter characteristics include the GetAdjustedTransferRate( ) method, which calculates the actual transfer rate adjusted for delays and overhead in the transmitter 102. The GetAdjustedTransferRate( ) method obtains the adjusted rate of transfer in bits per second that accounts for the network traffic, hardware and software overhead and other delays. A transmitter may have some intelligent mechanism to study the flow and return and appropriate value, and this value may vary from time to time depending on such conditions as the network traffic. The broadcast encoder will use this adjusted transfer rate to arrive at a transfer rate to perform the transfer of data to the transmitter.

The adjusted transfer rate effectively is the data transfer rate that the transmitter 102 is able to handle. To effectively manage the data flow, the broadcast encoder 100 also needs to account for the incoming data flow rate. The broadcast encoder 100 may receive input data from several sources, each potentially at different rates. Further, the broadcast encoder may include one or more buffers to store incoming data. Some transmitters 102 may also have this capability. Transmitters that include an internal cache (or buffer) that is able to hold data are referred to as "none-blocking transmitters." The second type of transmitter does not cache data at all, in which case all Send( ) and SendDatagrams( ) calls are blocked until data actually is sent by the transmitter. Such transmitters are referred to as "blocking transmitters."

The broadcast encoder 100 may determine if a transmitter 102 includes data buffers by calling the method GetFreeBuff( ). If a transmitter 102 includes a buffer, then it may be able to handle a faster data flow from the broadcast encoder 100 to the transmitter 102. In addition, the broadcast encoder 100 determines how fast returns are received from Send( ) or SendDatagram( ) calls. Using the adjusted transfer rate, incoming data rate or rates, the existence of buffers in the transmitters 102, and the speed of returns in response to the Send( ) or SendDatagrams( ) methods, all negotiated on a continuous basis between the broadcast encoder 100 and each of the transmitters 102, the broadcast encoder 100 is able to perform effective data flow control.

Figure 5:
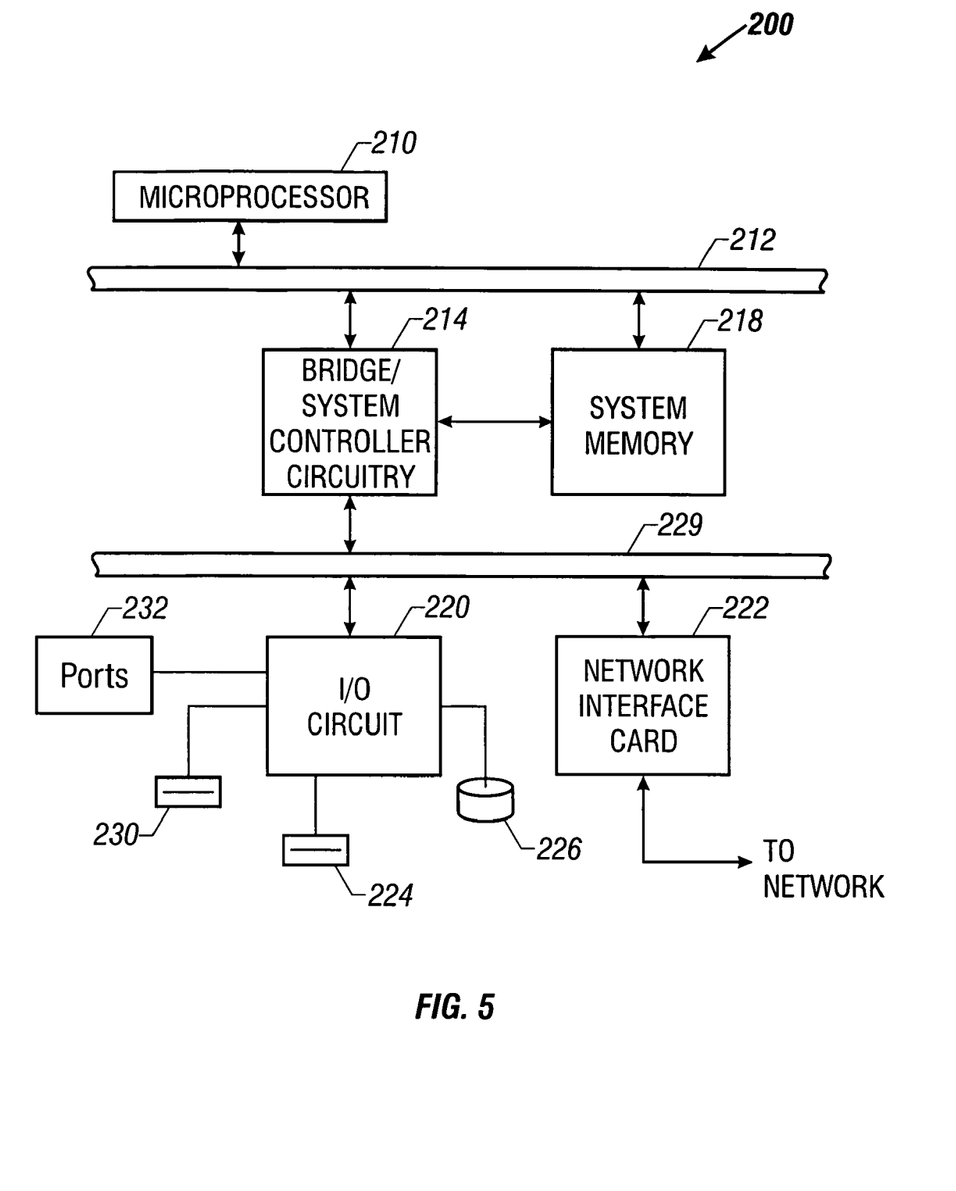
FIG. 5 is a block diagram of an example computer system that can be used in the broadcast system of FIG. 1.

Referring to FIG. 5, an example computer system 200 used in the broadcast headend system 10 may include a microprocessor 210 that is capable of running the broadcast encoder 100 and transmitters 102 according to embodiments of the invention. A system memory 218, the microprocessor 210, and a bridge/system controller circuitry 214 are all coupled to a host bus 212. The bridge circuitry 214 provides an interface from the host bus 212 to a down stream bus 229 that is coupled to an I/O controller 220 and a network interface card 222, as examples. The I/O controller 220 may also be coupled to serial and parallel ports 232. The computer 200 may also have, as examples, a CD or DVD drive 230, a floppy disk drive 224, and/or a hard disk drive 226.

According to some embodiments, the broadcast encoder 100 and transmitters 102 may be stored on a suitable mass storage medium such as the CD or DVD drive 230, the floppy disk drive 224, or the hard disk drive 226. During execution, the broadcast encoder 100 and transmitters 102 or portions of the software modules may loaded into the system memory 218 for execution by the microprocessor 210. Data generated by the transmitters 102 may be transmitted over the network, serial or parallel ports, or other interfaces (not shown) to the uplink unit 16.

Thus, by continuously monitoring transmitter characteristics, the broadcast encoder can efficiently and accurately manage the transmission of broadcast signals containing both digital data and TV data over one or more transport media. Because the broadcast encoder monitors the transmitters on a continuous basis, changes in characteristics of a transmitter and corresponding transport medium can be ascertained by the broadcast encoder for adjustments.

Other embodiments are also included in the following claims. For example, even though specific units have been identified in the interactive broadcast system, other types of units may be used. In addition, the order of the tasks illustrated for the broadcast encoder may be modified and still achieve desirable results.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A transmission system, comprising:
    a data management module capable of managing data flow;
    a first transmitter module coupled to a transport medium and to the data management module, the transmitter module to contain first configuration information specifying at least one predefined transmission characteristic; and
    at least an additional transmitter module containing second configuration data,
    the data management module to access the first configuration information to determine the at least one predefined transmission characteristic and to modify data flow management based on the at least one predefined transmission characteristic and the data management module to access the second configuration information to determine at least one predefined transmission characteristic associated with said additional transmitter module,
    wherein each transmitter module is associated with a different transport medium, and the first configuration information is retrieved by the data management module at startup of the first transmitter module or data management module, and
    wherein the first configuration information comprises at least one of information to indicate if the first transmitter module is able to assign priorities to data, and information to indicate if the first transmitter module is able to perform bandwidth management.

2. The transmission system of claim 1, the data management module and first transmitter module to continue to exchange configuration information after startup.

3. The transmission system of claim 1, wherein the transmission characteristic of the first transmitter module varies over time.

4. The transmission system of claim 1, further comprising an interface between the data management module and the first transmitter module.

5. The transmission system of claim 4, wherein the interface includes an API interface.

6. The transmission system of claim 1, wherein the transmission characteristic indicates a data flow rate of the first transmitter module.

7. The transmission system of claim 6, wherein the data flow rate is adjusted to compensate for delays in the first transmitter module.

8. A transmission system comprising:
    a data management program capable of assembling data;
    a first transmitter capable of receiving data from the data management program and transmitting the data to a transport medium;
    a communication interface between the data management program and the first transmitter that enables the data management program and the first transmitter to negotiate the type of communication to be performed; and
    at least another transmitter coupled to at least another transport medium; and
    the first transmitter to contain configuration information specifying a characteristic of the first transmitter,
    the data management program to access the configuration information of the first transmitter and to modify data flow management based on the configuration information,
    wherein the configuration information comprises at least one of information to indicate if the first transmitter is able to assign priorities to data, and information to indicate if the first transmitter is able to perform bandwidth management.

9. The transmission system of claim 8, wherein the assembled data includes digital data and television data.

10. The transmission system of claim 8, wherein the transport media have different transmission characteristics.

11. The transmission system of claim 8, the data management program and the first transmitter to exchange information on a continuous basis.

12. The transmission system of claim 10, wherein the transport media have different data flow rates.

13. A computer-readable medium storing a program executable by a computer in a transmission system including a first transmitter coupled to a transport medium, the program comprising instructions for causing the computer to:
- retrieve stored information to identify at least one transmission characteristic of the first transmitter;
- modify data flow management based on the identified at least one transmission characteristic; and
- identify a transmission characteristic of at least another transport medium over which data is to be transmitted by at least another transmitter,
- wherein the information comprises at least one of information to indicate if the first transmitter is able to assign priorities to data, and information to indicate if the first transmitter is able to perform bandwidth management.

14. The computer-readable medium of claim 13, wherein the transport media have different transmission characteristics.

15. The computer-readable medium of claim 13, wherein the transmission system further includes a data management module, the program further comprising instructions causing the computer to cause the data management module and the first transmitter to exchange information relating to the transport medium's said at least one transmission characteristic.

16. The computer-readable medium of claim 15, wherein the data management module and the first transmitter exchange information on a continuous basis.

17. A method of managing data flow over a transport medium in an interactive transmission system, comprising:
- accessing stored configuration information;
- identifying, based on the accessed configuration information, at least one transmission characteristic of a first transmitter used to transmit data over the transport medium;
- modifying data flow management based on the identified at least one transmission characteristic; and
- identifying a transmission characteristic of at least another transmitter used to transmit data over a different transport medium,
- wherein the configuration information comprises at least one of information to indicate if the first transmitter is able to assign priorities to data, and information to indicate if the first transmitter is able to perform bandwidth management.

18. The method of claim 17, wherein the first transmitter is associated with the different transport media have different transmission characteristics.

19. The method of claim 17, wherein the at least one transmission characteristic of the first transmitter is identified on a continuous basis.

20. The method of claim 17, the configuration information to specify one or more of the following:
- maximum transfer rate, maximum size of each data packet, and usage of compression.

21. A transmission system, comprising:
- a data management module capable of managing data flow; and
- a transmitter module coupled to a transport medium and to the data management module, the transmitter module to contain configuration information specifying at least one predefined transmission characteristic defining a capability of the transmitter module,
- the data management module to access the configuration information to determine the at least one predefined transmission characteristic and to modify data flow management based on the at least one predefined transmission characteristic, wherein the configuration information is retrieved by the data management module at startup of the transmitter module or data management module, and
- wherein the configuration information comprises at least one of information to indicate if the transmitter module is able to assign priorities to data, and information to indicate if the transmitter module is able to perform bandwidth management.

22. The transmission system of claim 21, wherein the transmission characteristic of the transmitter module varies over time.

23. The transmission system of claim 21, further comprising an interface between the data management module and the transmitter module.

24. The transmission system of claim 21, wherein the transport medium includes a medium selected from the group consisting of an airwave transmission, a cable transmission, a satellite transmission, a digital television transmission, and a computer network.

25. The transmission system of claim 21, the data management module and transmitter module to continue to exchange configuration information after startup.

26. A computer-readable medium storing a program executable by a computer in a transmission system including a transmitter module coupled to a transport medium and a data management module, the program comprising instructions for causing the computer to:
- retrieve stored information to identify at least one transmission characteristic of the transport medium;
- modify data flow management based on the identified at least one transmission characteristic; and
- cause the data management module and the transmitter module to exchange information relating to the transport medium's said at least one transmission characteristic,
- wherein the data management module and the transmitter module exchange information on a continuous basis,
- wherein the information comprises at least one of information to indicate if the transmitter module is able to assign priorities to data, and information to indicate if the transmitter module is able to perform bandwidth management.

27. A method of managing data flow over a transport medium in an interactive transmission system, comprising:
- accessing stored configuration information;
- identifying, based on the accessed configuration information, at least one transmission characteristic of a transmitter module used to transmit data over the transport medium; and
- modifying data flow management based on the identified at least one transmission characteristic,
- wherein the configuration information comprises at least one of information to indicate if the transmitter module is able to assign priorities to data, and information to indicate if the transmitter module is able to perform bandwidth management.

28. The method of claim 27, the configuration information to specify one or more of the following:
- maximum transfer rate, maximum size of each data packet, and usage of compression.

29. A transmission system, comprising:
- a data management module capable of managing data flow;
- a first transmitter module coupled to a transport medium and to the data management module, the first transmitter module to contain configuration information specifying at least one predefined transmission characteristic; and at least an additional transmitter module, the data management module to access the configuration information to determine the at least one predefined transmission characteristic and to modify data flow management based on the at least one predefined transmission characteristic, wherein each transmitter module is associated with a different transport medium, and the configuration information comprises at least one of information to indicate if the first transmitter module is able to assign priorities to data, and information to indicate if the transmitter module is able to perform bandwidth management.

\* \* \* \* \*